US012659340B2

(12) United States Patent
Fellows

(10) Patent No.: US 12,659,340 B2
(45) **Date of Patent: \*Jun. 16, 2026**

(54) CYBER THREAT DEFENSE SYSTEM, COMPONENTS, AND A METHOD FOR USING ARTIFICIAL INTELLIGENCE MODELS TRAINED ON A NORMAL PATTERN OF LIFE FOR SYSTEMS WITH UNUSUAL DATA SOURCES

(71) Applicant: Darktrace Holdings Limited

(72) Inventor: Simon David Lincoln Fellows, Cambridge (GB)

(73) Assignee: Darktrace Holdings Limited, Cambridge (GB)

( \* ) Notice: Subject to any disclaimer, the term of this patent is extended or adjusted under 35 U.S.C. 154(b) by 102 days.

This patent is subject to a terminal disclaimer.

(21) Appl. No.: 18/427,616

(22) Filed: Jan. 30, 2024

(65) Prior Publication Data

US 2024/0205258 A1 Jun. 20, 2024

Related U.S. Application Data

(63) Continuation of application No. 16/941,884, filed on Jul. 29, 2020, now Pat. No. 11,924,238, which is a (Continued)

(51) Int. Cl.
*H04L 9/40* (2022.01)
*G06F 21/55* (2013.01)
(Continued)

(52) U.S. Cl.
CPC ......... *H04L 63/1433* (2013.01); *G06N 20/00* (2019.01); *H04L 43/12* (2013.01); *H04L 63/1441* (2013.01)

(58) Field of Classification Search
CPC . G06N 20/10; H04L 63/1425; H04L 63/1433; H04L 63/1416; H04L 2463/144; G06F 21/55
See application file for complete search history.

(56) References Cited

U.S. PATENT DOCUMENTS 10,050,987 B1 \* 8/2018 Mohta ................... H04W 12/12
10,530,749 B1 \* 1/2020 Park .................... H04L 63/0245
(Continued)

FOREIGN PATENT DOCUMENTS

EP 3393086 A1 10/2018

OTHER PUBLICATIONS

Settani et al., "Protecting cyber physical production systems using anomaly detection to enable self-adaptation," 2018 IEEE Industrial Cyber-Physical Systems (ICPS) Year: 2018 | Conference Paper | Publisher: IEEE.\*
(Continued)

*Primary Examiner* — Roderick Tolentino
(74) *Attorney, Agent, or Firm* — Rutan and Tucker, LLP

(57) ABSTRACT

A cyber-defense appliance securely communicates and cooperates with a suite of different lightweight probes that can ingest onboard traffic from multiple different independent systems using protocols for at least one of a data link layer, a physical layer, and then one or more of an application layer, a transport layer, a network layer, and any combination of these layers when a protocol is used in that layer in the independent system. The lightweight probe ingests data and meta data with an independent system it resides within. The appliance has AI models to model a normal pattern of life in each of the independent systems using the data and/or meta data from protocols listed above. An analyzer module cooperates with the AI models that model a normal pattern of life in each of the independent
(Continued)

systems to determine when abnormal behavior or suspicious activity is detected.

18 Claims, 4 Drawing Sheets

Related U.S. Application Data continuation-in-part of application No. 16/278,953, filed on Feb. 19, 2019, now Pat. No. 11,843,628.

(60) Provisional application No. 62/880,450, filed on Jul. 30, 2019, provisional application No. 62/632,623, filed on Feb. 20, 2018.

(51) Int. Cl.
    G06N 20/00          (2019.01)
    H04L 43/12          (2022.01)

(56)                References Cited

U.S. PATENT DOCUMENTS

| | | | | |
|---|---|---|---|---|
| 11,689,544 B2* | 6/2023 | Ciocarlie | .............. | H04L 67/535 726/23 |
| 2013/0054783 A1* | 2/2013 | Ge | ..................... | H04L 43/0823 709/224 |
| 2017/0230410 A1* | 8/2017 | Hassanzadeh | ......... | G06N 20/00 |
| 2018/0234302 A1* | 8/2018 | James | ................... | G06N 20/00 |
| 2019/0036948 A1 | 1/2019 | Yonatan | | |
| 2019/0089722 A1* | 3/2019 | Ciocarlie | ........... | H04L 63/1408 |
| 2019/0132346 A1 | 5/2019 | Christian | | |
| 2019/0132358 A1* | 5/2019 | DiValentin | ......... | H04L 63/1416 |
| 2019/0141058 A1* | 5/2019 | Hassanzadeh | ...... | H04L 41/0631 |
| 2019/0236177 A1* | 8/2019 | Jain | ..................... | G06F 16/2365 |

OTHER PUBLICATIONS

Sarkar et al., "Votnet: Hybrid Simulation of Virtual Operational Technology Network for Cybersecurity Assessment," 2018 Winter Simulation Conference (WSC) Year: 2018 | Conference Paper | Publisher: IEEE.*

Schuster Franka Et al., "Towards Learning Normality for Anomaly Detction in idustrial Control Networks", Jun. 25, 2013.

European Patent Office, European Search Report, 9 pages, Nov. 30, 2020.

Restriction Requirement, The United States Patent and Trademark Office, 6 pages, Jun. 7, 2022.

Non-Final Office Action, The United States Patent and Trademark Office, 61 pages, Dec. 1, 2021.

Final Office Action, The United States Patent and Trademark Office, 40 p. Jun. 28, 2022.

* cited by examiner

CYBER THREAT DEFENSE SYSTEM, COMPONENTS, AND A METHOD FOR USING ARTIFICIAL INTELLIGENCE MODELS TRAINED ON A NORMAL PATTERN OF LIFE FOR SYSTEMS WITH UNUSUAL DATA SOURCES

RELATED APPLICATION

This application claims the benefit and priority of 35 USC 120 from U.S. patent application Ser. No. 16/941,884, filed Jul. 29, 2020, titled "A CYBER THREAT DEFENSE SYSTEM, COMPONENTS, AND A METHOD FOR USING ARTIFICIAL INTELLIGENCE MODELS TRAINED ON A NORMAL PATTERN OF LIFE FOR SYSTEMS WITH UNUSUAL DATA SOURCES"; which claims priority to and the benefit of under 35 USC 119 of U.S. provisional patent application titled "A cyber security system with enhancements," filed Jul. 30, 2019, Ser. No. 62/880,450, which are incorporated herein by reference in their entirety. In addition, this application claims priority to and the benefit as a continuation in part application of under 35 USC 120 of U.S. patent application titled "A cyber security appliance for an operational technology network" filed Feb. 19, 2019, Ser. No. 16/278,953, which claims the benefit of under 35 USC 119 to U.S. provisional patent application titled "A cyber defense system with various improvements," filed Feb. 20, 2018, Ser. No. 62/632,623. All of the above are incorporated herein by reference in their entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

BACKGROUND

Due to the rise in smart, internet-connected devices and systems, the "digital estate" under the control or management of an enterprise has grown rapidly and created security blind-spots and artificial segregation of network visibility. Where previously it was sufficient to cover logical zones with cyber threat defense measures such as an office network, an email environment, and a production environment, enterprise networks increasingly contain additional independent systems like IoT devices or internet-connected smart systems such as vehicles or manufacturing equipment. These independent systems have uncommon protocol and data types for a traditional cyber protection system to analyze. Commercial cyber threat defense systems are restricted to logical enterprise zones by the specialization and focus of their machine learning approach, which is not versatile enough to accommodate unseen data types and structures without significant development work. The lower level protocols in a protocol stack also have widely varying data types that are different than those typically analyzed by most commercial third party cyber security protection systems; thus, making them unusual protocols to be analyzed by a traditional cyber protection system.

SUMMARY

In an embodiment, a cyber threat defense system protects an independent system from cyber threats. The AI-based cyber threat defense system can have at least the following components.

A central cyber defense appliance that unites diverse independent systems with traditional enterprise zones in one environment for analysis of any potential cyber threats to detect the cyber threats. The central cyber defense appliance facilitates the uniting of the analysis of independent systems with traditional enterprise zones by one or more extensions of the cyber threat defense system implemented in the form of lightweight probes. A lightweight probe integrates within an independent system to extend monitoring and gathering of data capability of the centralized cyber defense appliance. The lightweight probe provides at least remote monitoring and gathering on 1) data, 2) meta data, and 3) a combination of both, from one or more protocols and data types utilized in any of i) a data link layer, ii) a physical layer, or iii) both; and then, one or more of the following network stack layers when that layer is utilized in the independent system. The following network stack layers can include any of iv) an application layer, v) a transport layer, vi) a network layer, and vii) any combination of these three layers when that layer is utilized in the independent system.

The centralized cyber defense appliance has one or more Artificial Intelligence (AI) models trained to model a normal pattern of life for independent systems connecting to the central cyber defense appliance. An AI model can be trained to model the normal pattern of life for the independent system from the data and/or the meta data from the protocols and data types in any of i) the data link layer and/or ii) physical layer from the first independent system or iii) both; and then, one or more of the following network stack layers of iv) an application layer, v) a transport layer, vi) a network layer, and vii) any combination of these three layers when that layer is utilized in the independent system being modeled. The AI model of the normal pattern of life for the independent system can use unsupervised machine learning algorithms and feedback on the data and/or the meta data from protocols and data types in the network stack layers utilized in that independent system to routinely update the AI model of the normal pattern of life of the independent system, during an operation of the independent system.

These and other features of the design provided herein can be better understood with reference to the drawings, description, and claims, all of which form the disclosure of this patent application.

DRAWINGS

The drawings refer to some embodiments of the design provided herein in which.

Figure 1:
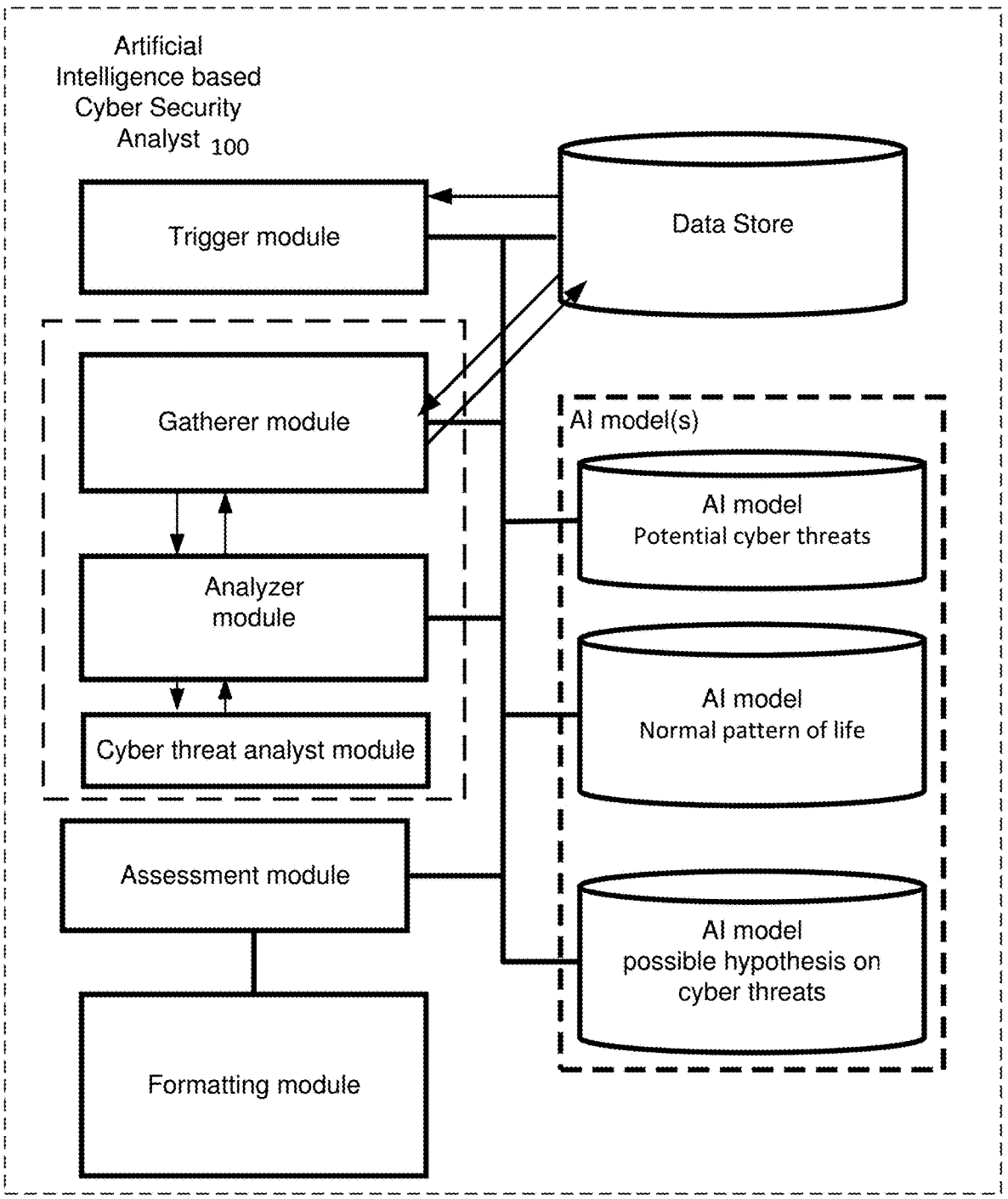
FIG. 1 illustrates a block diagram of an embodiment of a cyber defense appliance in the cyber threat defense system to protect an independent system from cyber threats.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DETAILED DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, the lightweight probes cooperate with the AI models modeling these independent systems with data and meta data from non-traditional protocols with unusual data types to detect at least one of i) the abnormal behavior, ii) the suspicious activity, and iii) the combination of both occurring in that independent system with unusual data types. This system is able to get data—whether pre-processed metadata or network data—from sources that would not be treated as part of the 'enterprise' network traditionally (all kinds of physical and data links, and the raw or metadata of the higher levels they carry) and uniting them in the same platform, and utilize the same unsupervised learning on them to detect anomaly that is used on more traditional sources. The lightweight probe provides potential ways to getting this data and meta data from 'non-traditional' environments, tackling the particulars of those environments (like intermittent connectivity), and embedding that data into the existing platform and analysis processes. The system is flexible enough to receive data gathered from 'unusual' sources, like IoT and even cars or ships, in the same platform, and detect anomaly using the same versatile machine learning, and representing it as part of the same extended digital estate with traditional IT networks and email networks.

Terms

The terms, for example, 'data link layer' and 'physical layer' are used in this description. The 'data link layer' and 'physical layer' are communication layers that facilitate the point-to-point transfer of information within a data network, carrying higher layers that usually include additional addressing and application information. Organizations often use "Ethernet" (a single descriptor of a particular physical and data link combination) for most typical IT systems, but parts of their digital estate can be communicating using various different implementations of these layers. The Figures and text herein, such as FIG. 3 and its text, give examples of their meaning in the context discussed herein. Each independent system may utilize its own proprietary or industry-specific protocols at the 'data link layer' and 'physical layer', resulting in unfamiliar protocol structures and/or different higher layers, such as the network layer/internet layer, where typical security systems would perform analysis on industry-standard IT protocols such TCP/IP, SMTP (Email), SSH, Kerberos.

FIG. 1 illustrates a block diagram of an embodiment of a cyber defense appliance to protect an independent system from cyber threats.

The centralized cyber defense appliance 100 may include a trigger module, a gatherer module, an analyzer module, an assessment module, a formatting module, one or more interfaces to the lightweight probes, one or more AI models trained with machine learning on a normal pattern of life in the independent system, and one or more AI models trained on possible cyber threats.

The central cyber defense appliance 100 that unites diverse independent systems with traditional enterprise zones in one environment for analysis of any potential cyber threats to detect the cyber threats. The central cyber defense appliance 100 facilitates the uniting of the analysis of independent systems with traditional enterprise zones by one or more extensions of the cyber threat defense system implemented in the form of lightweight probes. The centralized cyber defense appliance 100 has one or more AI models trained to model a normal pattern of life in each of the independent systems using data and/or meta data from the protocols and data types in at least one of i) the data link layer and/or ii) physical layer or iii) both from the independent system; and then, one or more of the following network stack layers of iv) an application layer, v) a transport layer, vi) a network layer, and vii) any combination of these three layers when that layer is utilized in the independent system being modeled. Each independent system typically utilizes its own proprietary or industry-specific physical and data-link-layer protocol and data types specific to that independent system; in addition to, any other layers in the network stack of layers.

The traditional enterprise zones can include i) an email network, ii) an information technology network, iii) a cloud-based platform, iv) a Software-as-a-Service based environment, and v) any combination of these four. The independent systems are selected from a group consisting of i) Internet of Things (IOT) devices, ii) a vehicle's autonomous network, iii) ships, iv) airplanes, v) any systems not included in the traditional enterprise zones listed above, and vi) any combination of these.

The centralized cyber defense appliance 100 has one or more artificial intelligence models that model a normal pattern of life on the data points sent by the one or more probes from each of the independent systems as well as the data points from existing enterprise sources in tandem. The centralized cyber defense appliance 100 can have a separate AI model for the first independent system and the second independent system in order to detect the cyber threats. The AI model of the normal pattern of life for the independent system can use unsupervised machine learning algorithms and feedback on the data and/or the meta data from the protocols and data types in the various layers to routinely update the AI model of the normal pattern of life during an operation of the independent system. The core processing is versatile and does not require tailored algorithms to each platform to produce anomaly detection outputs. Tailored algorithms can be developed but are not required.

An AI model can be trained to model the normal pattern of life for the independent system from the data and/or the meta data from the protocols and data types in any of i) a data link layer, ii) a physical layer, or iii) both; and then, one or more of the following network stack layers when that layer is utilized in the independent system. The following network stack layers can include any of iv) an application layer, v) a transport layer, vi) a network layer, and vii) any combination of these three layers when that layer is utilized in the independent system. The AI model of the normal pattern of life for the independent system can use unsupervised machine learning algorithms and feedback on the data and/or the meta data from protocols and data types in the network stack layers utilized in that independent system to routinely update the AI model of the normal pattern of life of the independent system, during an operation of the independent system.

The cyber-defense appliance securely communicates and cooperates with a suite of different lightweight probes that can ingest onboard traffic from multiple different independent systems using protocols for at least one of a data link layer, a physical layer, and then one or more of an application layer, a transport layer, a network layer, and any combination of these layers when a protocol is used in that layer in the independent system. The centralized cyber defense appliance 100 can securely communicate and cooperate with a suite of two or more different lightweight probes that have 1) one or more protocol analyzers, 2) an address and mapping to an interface with a third party protocol analyzer, 3) an address and mapping to a different interface for the centralized cyber defense appliance 100.

A lightweight probe integrates within an independent system to extend monitoring and gathering of data capability of the centralized cyber defense appliance 100. The lightweight probe provides at least remote monitoring and gathering on 1) data, 2) meta data, and 3) a combination of both, from one or more protocols and data types utilized in any of i) a data link layer, ii) a physical layer, or iii) both; and then, one or more of the following network stack layers when that layer is utilized in the independent system. The following network stack layers can include any of iv) an application layer, v) a transport layer, vi) a network layer, and vii) any combination of these three layers when that layer is utilized in the independent system. The lightweight probe may be implemented external to the main system and receive system information as metadata from a third-party sensor or processor, perform a limited amount of onboard analysis or protocol parsing to retrieve the desired network-layer data, and is sensitive to the specifics of independent systems of this nature (such as, but not limited to, bandwidth limitations, power availability and intermittent network access).

Figure 2:
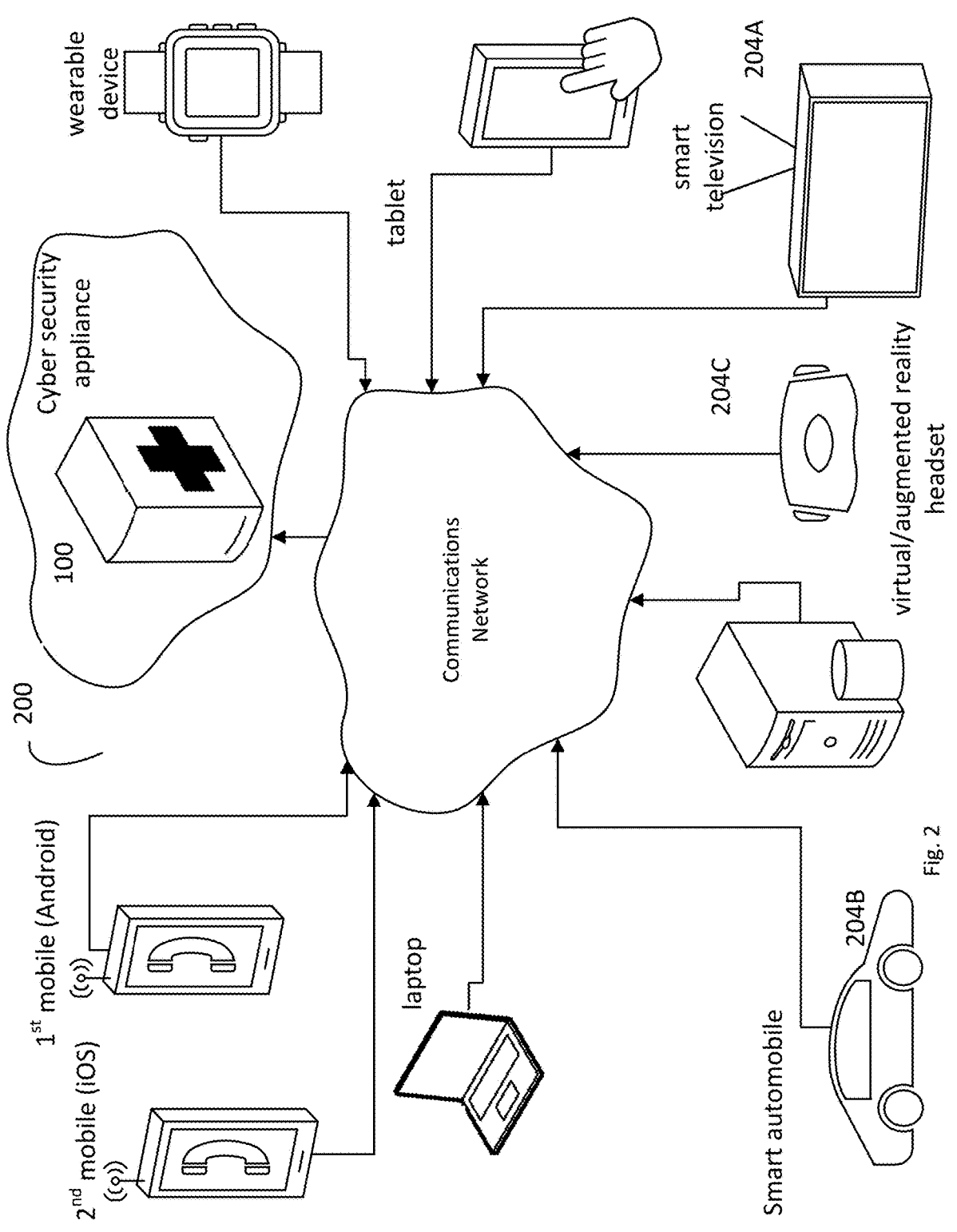
FIG. 2 illustrates a block diagram of an embodiment of a suite of two or more different lightweight probes communicating and cooperating with a centralized cyber defense appliance in the cyber threat defense system.

The lightweight probes are part of a suite of two or more different lightweight probes (for example, see FIG. 2). Each lightweight probe can have one or more protocol analyzers for monitoring and gathering of 1) data, 2) meta data and 3) a combination of both, analyzer for monitoring and gathering of 1) data, 2) meta data and 3) a combination of both, from a first protocol and data types in the data link layer in the independent system including protocol types and data types which are encapsulated by previously unfamiliar physical layer and/or data link layer protocols to the system. For example, a first lightweight probe has a first protocol analyzer for monitoring and gathering of 1) data, 2) meta data and 3) a combination of both, from a first protocol and data types in the data link layer in the independent system. The first protocol in the data link layer can be, for example, Address Resolution Protocol, Neighbor Discovery Protocol, Open Shortest Path First, Tunnels L2TP, Point-to-Point Protocol, Medium access control protocol, Logical link control (LLC), ISDN, FDDI, etc.

Another lightweight probe can have a second protocol analyzer for monitoring and gathering of 1) data, 2) meta data and 3) a combination of both, from a second protocol and data types in the physical layer in a second independent system. Some example protocols in the physical layer can be, for example, Digital Subscriber Line, UTP, RS-232, Plesiochronous Digital Hierarchy, Synchronous Digital Hierarchy, Synchronous Optical Networking, Passive Optical Network, OTN, numerous 802 IEEE standards, Universal Serial Bus, Bluetooth, RS-449, etc.

The lightweight probes ingest onboard traffic from any of sensors and other components within the independent system they integrate in, in order to communicate their data and/or meta data to the centralized cyber defense appliance 100. The lightweight probes ingest onboard traffic from any of the sensors and the other components within the independent system in order to derive the data and/or meta data from the one or more protocols and data types to be sent on to the centralized cyber defense appliance 100. The data can be routed for the express purpose of sending to the centralized appliance, and/or the data can be produced for a different purpose but then the cyber security appliance can be sent a copy of that data for its own analysis.

The centralized cyber defense appliance 100 securely communicates and cooperates with the suite of two or more different lightweight probes that have 1) one or more protocol analyzers, 2) an address and mapping to an interface with a third party protocol analyzer, 3) an address and mapping to an interface with the centralized cyber defense appliance 100. The probes can ingest onboard traffic from a plurality of different independent systems, such as i) Internet of Things (IOT) devices, ii) autonomous driving vehicles, iii) ships, iv) airplanes, v) etc., using protocols in 1) an application layer, 2) a transport layer, or 3) a network layer encapsulated in an unfamiliar data link layer, or physical layer.

The centralized cyber defense appliance 100 has one or more AI models configured to model a normal pattern of life in each of the independent systems using 1) data, 2) meta data and 3) a combination of both, from protocols for at least 1) the network layer and/or 2) the transport layer for data encapsulated by physical and datalink layer protocols specific to the independent system. The AI model can model the normal pattern of life for 1) data, 2) meta data and 3) a combination of both, from one or more protocols and data types utilized in any of i) a data link layer, ii) a physical layer, or iii) both; as well as, 1) data, 2) meta data, and 3) a combination of both, from protocols in any of iv) an application layer, v) a transport layer, vi) a network layer, and vii) any combination of these three layers when a protocol is used in that layer in the independent systems. Thus, one or more artificial intelligence models trained to model the normal pattern of life for 1) data, 2) meta data, and 3) a combination of both, from the unusual protocols and data types being analyzed in these independent systems. The lightweight probes integrated into the independent systems may have one or more protocol analyzers to analyze the activity in the protocols and data types used in any of i) a data link layer, ii) a physical layer, iii) an application layer, iv) a transport layer, v) a network layer, and vi) any combination of these layers when a protocol is used in that layer in the independent system. The data points can be securely conveyed back to the central cyber security appliance 100 which has generally AI models trained, for each independent system, to model a normal pattern of life using 1) data, 2) meta data, and 3) a combination of both in the protocols and data types used in at least the physical layer and/or protocols and data types used in the data link layer.

The analyzer module cooperates with the one or more AI models trained to model a normal pattern of life in each of the independent systems to determine when any of i) an abnormal behavior, ii) a suspicious activity, and iii) any combination of both is detected in that independent system, which at least uses the protocols in at least one of 1) the data link layer and 2) the physical layer. Each AI model can be trained to model the normal pattern of life of a given independent system, such as an IoT device's pattern of life, which uses the 1) data, 2) meta data, and 3) a combination of both in the protocols of at least 1) the data link layer and 2) the physical layer.

The trigger module may cooperate with one or more AI models trained with machine learning on a normal pattern of life in the system, at least one of i) an abnormal behavior, ii) a suspicious activity, and iii) any combination of both, from one or more entities in the system. Upon detecting the i) abnormal behavior, ii) a suspicious activity, and iii) any combination of both. The trigger module cooperates with the analyzer module on what additional types of data points are needed to support or refute a given cyber threat and then cooperate with the data gather module to obtain that data.

The cyber security appliance 100 may have a cyber threat analyst module. The cyber security appliance 100 can use i) one or more AI models to form and investigate hypotheses, ii) a set of scripts to form and investigate hypotheses, and iii) any combination of both, in order to form and investigate hypotheses on what are a possible set of cyber threats. The cyber threat analyst module to form and investigate hypotheses on what are a possible set of cyber threats can use any of i) the one or more AI models to form and investigate hypotheses trained with supervised machine learning on human-led cyber threat investigations and then steps, data, metrics, and meta data on how to support or to refute the hypotheses on what are a possible set of cyber threats, ii) the set of scripts to form and investigate hypotheses to aid in how to form the hypotheses on what are a possible set of cyber threats and then the steps, data, metrics, and meta data to collect additional system data points to support or to refute the possible cyber threat hypotheses, and iii) any combination of both.

The cyber threat analyst module to form and investigate hypotheses on what are a possible set of cyber threats cooperates with the analyzer module to conduct an investigation on a possible set of cyber threats hypotheses that would include the at least one of i) the abnormal behavior, ii) the suspicious activity, and iii) any combination of both, identified through cooperation with the one or more AI models trained with machine learning on the normal pattern of life in the system.

The gatherer module may collect data to support or refute each of the one or more possible cyber threat hypotheses that could include this abnormal behavior or suspicious activity by cooperating with the cyber threat analyst module with the set of scripts and/or AI models to form and investigate hypotheses on possible cyber threats and the analyzer module. The gatherer module may collect data to support or refute each of the one or more possible cyber threat hypotheses by cooperating with a data store that stores system data and meta data. The data store may cooperate with various external probes and other sensors to collect system data points on all of the networks and independent systems connected to the centralized cyber defense appliance 100.

The gatherer module may further extract data at the request of the analyzer module on each possible hypothetical threat that would include the abnormal behavior or suspicious activity and then filtering that collection of data down to relevant points of data to either 1) support or 2) refute each particular hypothesis of what the cyber threat, the suspicious activity and/or abnormal behavior relates to. The gatherer module may send the filtered down relevant points of data to either 1) support or 2) refute each particular hypothesis to the analyzer module. The analyzer module works with one or more algorithms used by the AI models trained with machine learning on possible cyber threats to make a determination on a probable likelihood of whether that particular hypothesis is supported or refuted.

Each AI model of the normal pattern of life in the independent system may use unsupervised machine learning algorithms and feedback from the data and/or meta data from protocols and data types in the i) data link layer and/or ii) the physical layer to routinely update the model of the normal pattern of life during an operation of the independent system.

The cyber defense appliance 100 can also have one or more AI models to model the normal pattern of life in the independent system in the upper protocol layers such as the i) network layer and/or ii) the transport layer. However, the cyber security appliance 100 can monitor network traffic, email traffic, etc. with probes to feed this data into the cyber security appliance 100.

The analyzer module and AI models in the cyber security appliance 100 cooperate to model the normal pattern of life in the system and to look for deviations.

The analyzer module can perform a machine learning analysis of the protocol traffic and data to understand what a normal process is in the, for example, IoT device; and thus, by deviation, what is an abnormal behavior. This analysis can allow for the identification of the abnormal behavior and sometimes suspicious activity. The machine learning can factor in more than just the data and/or meta data going on within the example IoT device, such as a smart TV. The machine learning can monitor external networks interacting with the example IoT device to determine whether the current behavior is actually abnormal when factoring in what is going on in the external network relative to the example IoT device.

The central cyber defense appliance 100 can contextualize all of an entity's network data from the independent systems in the entity's network along with its more common network parts, such as standard email and IT networks. The network telemetry data from these independent systems having uncommon protocol and data types have their 1) data, 2) meta data, and 3) a combination of both processed through the machine learning analysis of the cyber defense platform and surfaced alongside data from these traditional sources. This wide approach to data gathering and analysis spots threats that move laterally from these independent systems having uncommon protocol and data types. In addition, the centralized cyber defense appliance 100 either retrieves or has pushed the network telemetry data and meta data, and then analyzes this network telemetry data and/or meta data for security purposes on the independent system, such as an IoT device. The network telemetry data and/or meta data is fed to the AI models trained with machine learning on a normal pattern of life for that independent system with 1)

data, 2) meta data and 3) a combination of both, from the one or more protocols and data types utilized in any of i) a data link layer, and ii) a physical layer as well as, 1) data, 2) meta data, and 3) a combination of both, from protocols in any of iii) an application layer, iv) a transport layer, v) a network layer, and vi) any combination of these three layers when a protocol is used in that layer in the independent system.

Each lightweight probe can take in metrics from sensors and/or hardware to create the AI model of a normal pattern of life in that independent system using 1) data, 2) meta data, and 3) a combination of both, from in any of i) the data link layer, ii) physical layer, iii) an application layer, iv) a transport layer, v) a network layer, and vi) any combination of these layers; as well as, then create thresholds of what would constitute abnormal behavior or suspicious activity indicated in a current set of metrics under analysis with the AI models. The cyber security appliance 100 can identify threats by spotting deviations from normal behavior to create a system-wide response regimen. The cyber security appliance 100 can have an analyzer module to execute a comparison of input data from one or more sensors and any other metrics or events under analysis to at least one AI machine learning model of the independent system using a normal behavior benchmark to spot behavior deviating from normal benign behavior. The analyzer module can use a chain of one or more of these abnormal behaviors and suspicious activities to detect a cyber threat. The analyzer module analyzes i) a current set of data and/or meta data under analysis to ii) the data and/or meta data modeled in the AI model of the normal pattern of life for the independent system to detect the cyber threat.

Next, the machine learning has to be trained on how to deal with missing gaps of data and/or meta data because of long periods of non-connectivity to the remote IoT device and the possibility of limited buffering/storage which may only store the last hour of operating data, while still supplying event data and/or raw data merely often enough to be useful. The AI models are trained and configured to deal with the arrival of very delayed data in the machine learning algorithms. The machine learning will need to also look at information with less fidelity, so the weightings in the algorithms are changed to examine the information it does have to evaluate. Thus, each independent system, such as each type of IoT device, can have its own weighting settings on evaluating different pieces of information factoring in at least fidelity of the data and/or frequency of gaps of data being conveyed back to cyber security appliance 100. The AI core machine learning is trained to deal with gaps and less information to analyze. The comparison module can identify whether the device associated with the sensor(s) is in a breach state. The cyber security appliance 100 can have an analyzer module to identify whether the breach state and a chain of relevant behavioral parameters correspond to a known or unknown threat. The analyzer module using the compactor increases the threshold amount of what is considered unusual because there is a less amount of data metrics to look at to determine if unusual/a deviation from the norm is occurring or not. In addition, the AI model analyzing for cyber threat by correlating a sequence of any of i) an abnormal behavior, ii) a suspicious activity, and iii) any combination of both to detect a threat can factor in the gaps and less information.

The AI models of the normal pattern of life of each of the independent systems and an analyzer module can cooperate with the lightweight probe to identify time periods associated with the data and meta data from one or more protocols and data types utilized in i) the data link layer, ii) the physical layer, and iii) any combination of these; as well as, iv) the application layer, v) the transport layer, vi) the network layer, and vii) any combination of these three layers when a protocol is used in that layer in the independent system 100. The time information helps with identifying gaps of data being conveyed. The one or more models that model a normal pattern of life in the independent system have one or more machine learning algorithms to guide unsupervised learning on how to deal with missing gaps of data because of i) long periods of non-connectivity to the independent system, such as a remote IoT device, and ii) loss of data due to limited buffering/storage space for use by the lightweight probe on the independent system, and iii) any combination of both.

After reviewing the data from the lightweight probes and AI models with machine learning, then the autonomous response module, such as Antigena, can be used to take an autonomous action (programmed ahead of time and not user/human initiated) in order to remediate a cyber threat in the independent system.

The autonomous response module can generate an autonomous response for the independent system to take to remediate the detected cyber threat. The autonomous response module can send information to take to remediate the detected cyber threat over the secure communication mechanism to the lightweight probe.

The lightweight probe's integration with onboard sensors of these independent systems allows the centralized cyber defense appliance 100 to securely communicate and inform onboard systems that something is wrong and/or prompt an autonomous response to prevent device hijacking.

The centralized cyber defense appliance 100 can have an autonomous action module to take at least one action to remediate the breach state. The centralized cyber defense appliance 100 needs to determine what kinds of autonomous actions are available. The lightweight probe may then interrogate the host device to find out what types of actions it can request and/or direct, such as turning off a communication port, turning off the device, forcing only actions within a normal set of parameters, etc. The cyber security appliance 100 working with its autonomous response module, such as Antigena, securely communicates with the lightweight probe, and then upon detecting the unusual behavior, could then be used to send the autonomous response.

Example autonomous responses as a remediation action can include examples such as the following.

The autonomous response can restrict operations to a standard or normal set of operations; and thus, preventing unusual operations. This can ensure the independent system, such as an IoT device, behaves as expected (e.g. pattern-of-life is enforced). The autonomous response can alter an operating state of IoT device, such as shutting it down and/or going into a low power mode.

The autonomous response can alter connectivity to and from external devices from the independent system. For example, the autonomous response can shut down any external traffic into or out of the device. Shutting off external input into these normally autonomous devices, then allows any resident AI in the device to make decisions locally uncorrupted by a cyber threat having at least a portion of that threat exterior to the device.

The autonomous response can send an inoculation notification to warn of a potential threat to this device/system.

The centralized cyber defense appliance 100 can also flag up misconfigurations and give an overall view of the component health, even if this is not the first intended purpose.

Again, the AI models of the cyber defense appliance 100 need not merely analyze communications on, for example, the IP level in the TCP/IP protocol stack and/or OSI protocol stack, but rather, one or more AI models of the cyber defense appliance 100 can model a normal pattern of life and analyze data/metrics from at least one of a physical or data link layer, such as direct output of remote sensors and/or hardware, any of iv) an application layer, v) a transport layer, vi) a network layer, and vii) any combination of these three layers when a protocol is used in that layer in the independent system.

FIG. 2 illustrates a block diagram of an embodiment of a suite of two or more different lightweight probes communicating and cooperating with a centralized cyber defense appliance.

Each lightweight probe is part of a suite of two or more different lightweight probes. Each lightweight probe is configured to integrate within its corresponding independent system such as an example lightweight probe integrated in the smart TV 204A, another example lightweight probe integrated in the virtual reality headset 204C, and another example lightweight probe integrated in the autonomous vehicle 204B.

The suite of lightweight probes can have different lightweight probes capable of integrating with different types of independent systems—depending on what type of independent system it is and what protocol(s) are being analyzed in that independent system. The suite of lightweight probes can also have different lightweight probes capable of different functional capabilities—depending on what protocol analysis already exists in that independent system as well as what hardware capabilities exist in that independent system to support the lightweight probe to perform all of its functions such as a full protocol analysis.

Again, each lightweight probe can have one or more protocol analyzers for monitoring and gathering of 1) data, 2) meta data and 3) a combination of both, from protocols and data types in at least the data link layer and/or physical layer in the independent system as well as 1) data, 2) meta data and 3) a combination of both, from any of iv) an application layer, v) a transport layer, vi) a network layer, and vii) any combination of these three layers when a protocol is used in that layer in the independent system.

For extensibility, the lightweight probe must therefore be able to translate and/or transform ingested data to an acceptable format before transmission to the central cyber defense appliance 100 or perform a limited amount of onboard analysis or protocol parsing to retrieve the desired network-layer data. The lightweight probe is also easily modifiable to manage differing expectations and limitations of each system it is integrated within. The lightweight probe can communicate at least the data and/or meta data from protocols and data types in an output of sensors or external components when used in the independent system over a network to the centralized cyber defense appliance 100. The suite of lightweight probes is sensitive to the specifics of independent systems of this nature (such as, but not limited to, bandwidth limitations, power availability and intermittent network access).

The lightweight probe is implemented external to the centralized cyber defense appliance 100 and within the independent system itself to receive system information as the metadata from 1) a third-party sensor, 2) a processor in the independent system, and 3) any combination of both, and then configured to perform one or more of:

i) translation, transformation, or both on ingested system information to an acceptable format for the centralized cyber defense appliance 100 before transmission over the network to the centralized cyber defense appliance 100, ii) perform a limited amount of onboard analysis to filter down an amount of data needing to be transmitted compared to all of the ingested data from the independent system by the lightweight probe, and iii) perform protocol parsing to retrieve desired data and/or meta data from the data and/or meta data from any of i) the data link layer, ii) the physical layer, or iii) both; and then, one or more of iv) the application layer, v) the transport layer, vi) the network layer, and vii) any combination of these three layers when that layer is used within the independent system.

The lightweight probe within the independent system can i) communicate an output of one or more sensors within the independent system in the data and/or meta data communicated over the network, ii) cooperate with external components associated with the independent system to obtain the data and/or meta data communicated over the network, and iii) any combination of these two.

The central cyber defense appliance 100 unites the data and/or meta data from 1) the one or more independent systems with 2) a different set of data and/or meta data from the one or more traditional enterprise zones, connected to a same network, in the one environment for analysis of cyber threats in order to detect the cyber threats.

The lightweight probe is configured as software storable in the non-transitory medium in the independent system in the executable format to be executed by the processor in the independent system to convey one or more addresses and mapping details of an interface of the centralized cyber defense appliance 100. The components in the independent system can connect to the central cyber defense appliance 100 through the interface to send the data and/or meta data from a third party device to the central cyber defense appliance 100, and then the centralized cyber defense appliance 100 has one or more protocol analyzers to perform an analysis on the data and/or meta data, and then to feed the data and/or meta data into the AI model for the independent system.

The centralized cyber defense appliance for an independent system having an uncommon protocol and data type has to deal with two main issues that other cyber defense systems protecting email or information technology networks need not deal with—1) remote monitoring and gathering of data from the independent systems that use uncommon protocol and data types from those typically being protected, and 2) the independent systems have limited processing power and potentially limited storage capabilities available for the lightweight probes, which may be a third party product integrated within some of these independent systems.

The lightweight probe can ingest onboard traffic from any of sensors and other components within the independent system they integrate within order to obtain the data and meta data from one or more protocols and data types. The lightweight probe can ingest onboard traffic from any of sensors and other components directly, obtaining them from a component responsible for storing their data or meta data, and/or through an interface depending on the coded type of lightweight probe. The suite of lightweight probes communicates their data and/or meta data over a same network to the centralized cyber defense appliance.

The lightweight probe can be coded to establish a secure communication mechanism to communicate and cooperate with the centralized cyber defense appliance. The secure communication mechanism may be, for example, a secure tunnel connection, such as an SSH tunnel and/or a private key connection, directly between the lightweight probe and the cyber security appliance 100.

As discussed, the centralized cyber defense appliance can also have multiple different AI models. As discussed, an AI model can exist for each of the independent systems modelling that system, including an example independent system and another independent system. An AI model can exist for each layer of communication within the independent system modelling that systems' normal pattern of life. Alternatively, an AI model can exist for two or more of these independent systems and possibly the entire network, e-mail, IT network and all independent systems. Each of the independent systems are integrated with by its corresponding lightweight probe, within the suite of the two or more different lightweight probes communicating with the centralized cyber defense appliance. Each lightweight probe integrates with an independent system to provide at least remote monitoring and gathering of data and/or meta data from one or more protocols and data types utilized in any of 1) a data link layer, and 2) a physical layer; as well as, data and/or meta data from protocols in 3) an application layer, 4) a transport layer, or 5) a network layer. For example, a networked car or ship can have data and/or meta data occurring on all five communication layers. The remote monitoring and gathering of data is supplied to the centralized cyber defense appliance. The lightweight probe communicates the data and/or meta data from protocols and data types in at least i) the data link layer and/or ii) the physical layer and potentially from the application layer, the transport layer, and the network layer over a network to a centralized cyber defense appliance. The cyber defense appliance can ingest network data from unusual or alternative systems, such as IoT devices or larger machines like a vehicle's autonomous network, ships, airplanes, etc., with the aid of the lightweight probes. The lightweight probe can run on any kind of third-party hardware (virtualized or not). The network telemetry data and meta data is served by lightweight probes through interfacing with and/or monitoring of onboard sensors or other network elements. The AI model modelling the normal pattern of life for that independent system uses the data points sent back from the lightweight probe integrated with that independent system.

Again, the cyber defense appliance can use the analyzer module, which is configured to analyze the data and network traffic, to compare the data and/or meta data to the one or more AI models. The cyber defense appliance can have an autonomous response module configured to convey actions to over to the lightweight probe to remediate a detected cyber threat.

Different Types of Independent Systems—Depending on What Type of Independent System it is and What Protocol(s) are being Analyzed in that Independent System.

Lots of different types of IoT devices can use the lightweight probes. Many of these IoT devices can use a different type of protocol within either of the data link layer or the physical layer. For example, an autonomous car uses a different protocol and data types than a home security system. Each lightweight probe can be configured with its own protocol analyzer to analyze a specific protocol (utilized in the independent system with the unusual protocol) and the data types conveyed in that unusual protocol. Generally, the data types conveyed in that unusual protocol are network traffic but potentially host telemetry data can also be conveyed and subsequently analyzed.

In the suite of lightweight probes, 1) the lightweight probe can be a fully downloadable software product that is configured to run on and use the limited hardware capabilities of an independent system such as an IoT device. In another example, 2) a partnership between the cyber security vendor and each IoT manufacturer can be made. The lightweight probe can be built as a potentially hardware module with software product combination built into the IoT device itself. In a final example, 3) a lightweight probe may be a fully virtualized software component installed upon a component within the independent system. Next, the lightweight probe should feed this content back to a centralized master (including an onboard master in the cases of airplanes, and ships, due to processing and power restrictions) and have it passed through the same machine learning analyzers.

Note, some of the lightweight probes generally need not reserve a lot of on-device storage, as the responsibility of storing the historical data from this unusual source typically is the responsibility of another component in that independent system. A cyber security appliance 100 can periodically request retrieval of live traffic for a short period back to a central cyber defense appliance to be examined. In an alternative, the lightweight probe can on its own periodically forward live traffic for a short period back to a central cyber defense appliance to be examined.

In an embodiment, a suite of two or more different lightweight probes that have 1) one or more protocol analyzers, 2) an address and mapping to an interface with a third party protocol analyzer, 3) an address and mapping to an interface for the centralized cyber defense appliance, that can ingest onboard traffic from a plurality of different independent systems using protocols and data types found in at least 1) a data link layer, and/or 2) a physical layer as well as 3) an application layer, 4) a transport layer, 5) a network layer, and 6) any combination of these three layers when a protocol is used in that layer in the independent system.

In the example case when the lightweight probe cooperates with a third party protocol analyzer or already built in protocol analyzer in the independent system, then the lightweight probe can convey one or more addresses and mapping details of an interface of the centralized cyber defense appliance, such as a published API. The API is configured to accept already-produced metadata from third parties, especially when a lightweight probe is not viable to install/include for any reason. Alternatively, the lightweight probe can be coded to have an address and mapping to an interface with the third party protocol analyzer and communicate the corresponding data points to the cyber security appliance 100.

For scenarios where a lightweight probe cannot consume and monitor local traffic itself, the centralized cyber defense appliance can be fed a range of metadata and data from various inputs. The central cyber security appliance 100 can have a suite of published APIs for the data link layer and/or physical layer protocols so that each independent system, such as IoT devices, can have a very light amount of software to forward a copy of the relevant parts of the traffic and data to the interface of the external cyber security appliance 100 at regular intervals. These third parties' devices can also supply data and/or meta data from the application layer, the transport layer, and the network layer over to the centralized cyber defense appliance.

Different Functional Capabilities—Depending on What Protocol Analysis Already Exists in that Independent System as Well as What Hardware Capabilities Exist in that Independent System to Support the Set of Functions the Lightweight Probe is Capable of Performing The centralized cyber defense appliance can also have multiple different protocol analyzers to cooperate with probes that cannot fully perform the protocol analysis on the traffic in that independent system.

Some versions of the downloadable lightweight probe have to be coded to account for the incredibly low power availability in this kind of independent system that just is not normally built with a lot of memory storage and processing power for third party products on, for example, their IoT device.

Some of the lightweight probes in the suite are coded to run a full protocol analysis on the network telemetry data and communicate the analysis back to the cyber defense appliance. In this set of lightweight probes sufficient memory storage and processing power exists on the independent system to allow the downloaded lightweight probe to perform the full analysis as well as any of its other functions. In some cases, the lightweight probe may be an integrated chip or embeddable logic onto the chip to provide sufficient memory storage and processing power so that the independent system can allow the lightweight probe to perform its full analysis. A system on a chip or other integrated circuit with its own processors and memory combined with the software and other logic to obtain, perform its full analysis, and then feed data to cyber security appliance 100.

Next, often independent systems, such as example IoT devices, have limited processing power and limited storage capabilities to store and execute all of the functions of the lightweight probe. When this condition exists, then this type of lightweight probe from the suite of probes can send the data points to be fully analyzed on the cyber security appliance 100.

Thus, some of these lightweight probes in the suite are coded to run a limited protocol analysis on network telemetry data within the independent system that filters for relevant data and meta data from the protocol and data types; rather than, all data and metadata from network traffic within the independent system, and then feeds the relevant data and meta data through a secure communication mechanism over the network back to the centralized cyber defense appliance. The mixing in of some lightweight probe processing and some processing deferred to the central server occurs based on local resource and bandwidth to the central server constraints. The lightweight probe data gathers and sits resident on memory storage on the IoT device and uses processing power and memory storage of the IoT device in order to intelligently do some analysis to send back relevant data and meta data gathered to the cyber security appliance 100. The cyber defense platform connects through an interface e.g. (API) to receive the network telemetry data and then perform the fuller version of protocol analysis.

The lightweight probe can be configured to sit resident in a memory storage device in the independent system. The lightweight probe can be coded as software storable in the memory storage device in the independent system in an executable format to be executed by a processor in the independent system to perform one or more functions of the probe, such as conveying one or more addresses and mapping details of an interface (e.g. API) of the centralized cyber defense appliance. Thus, communication components in the independent system cooperate with the lightweight probe to connect to the central cyber defense appliance through the interface (e.g. API) to send data and/or meta data; and then, the centralized cyber defense appliance has one or more protocol analyzers to perform a protocol analysis on the data and/or meta data from the protocols and data types utilized in any of 1) the layers of the independent system including the data link layer and 2) the physical layer, and then to feed the data and/or meta data into the one or more AI models. The lightweight probe can be coded to be programmable by the user to regularly push data and meta data to the cyber security appliance 100.

Note, the lightweight probes configured with protocol analyzers have some minor differences between itself and a stand-alone cyber security platform. The lightweight probes do not always perform a deep packet ingestion but a measure of anomalousness on different input sources (sometimes DNS, sometimes pre-processed meta data, etc.) and in most cases of IoT devices there is none or very limited on-device storage for the downloadable lightweight probe to perform its full suite of functionality and store all of the historical data needed for analysis. An action the lightweight probes might use is to request retrieval of live traffic for a short period and transmit this back to the central security appliance to be examined by the AI models in light of the historical data.

A type of lightweight probe maybe a mere data gather. An onboard, lightweight probe can ingest telemetry data (primarily network data) and be a data gather that merely reports back a number of different types of metrics to analyze to determine when any of i) an abnormal behavior, ii) a suspicious activity, and iii) any combination of both is occurring in that independent system that the user/security team needs to be alerted to.

The lightweight probe feeds telemetry information from IoT or other autonomous systems back to a central cyber defense appliance including some additional functionally differences such as:

The central cyber defense appliance can contextualize all entities and their network data together including (data from sources including the suite of lightweight probes, email network, possibly the IT network) this data—treating the cloud infrastructure that supports the IoT devices in the same location as those devices in one-pane-of-glass;

Performing the analysis and machine learning mathematics on the data on a specific independent system to identify anomalies and develop a 'pattern of life' from sensor data;

Gathering the telemetry data in the context of security/gathering network data from the independent systems for analysis is unusual—generally the information is scraped to check on performance and configuration faults but not deviations from its normal pattern of life. The data can have big data analysis performed on this data; and Establish more secure communications. An IoT devices, such as smart parking meters, regularly communicate to its central website to call home and say it is alive. The security communication channels for communication between the probe and the cyber security appliance 100 generally have one or more additional security mechanisms to make these communications more encrypted and secured than general telemetry communications.

Additional Details

Some of the most relevant use cases are remote targets—independent system having uncommon protocol and data type, for example, autonomous/connected cars and Internet of Things devices compared to an IT network. A relevant use case of the lightweight probes cooperating with the cyber security appliance 100 are remote systems, such as a ship, autonomous/connected cars, and IoT devices. The growth of the IoT devices, autonomous vehicle systems, and autonomous devices opens up these devices to cyber threats and protection via ingestion of sensor data from these kinds of entity, fed through the same machine learning approach.

Depending on the size of the independent system having uncommon protocol and data type (from a small IoT device to a large autonomous ship), many multiple probes each monitoring different aspects of the independent system can feed traffic and data back to a central mirror, central security appliance, or an aggregating probe.

The lightweight probe can receive communications and directions from a central appliance via the interface. The centralized cyber defense appliance for LAN can look at data directly from an example IoT device as well as looking at the meta data associated with that IoT device observed from other network devices communicating with that IoT device.

The AI models that model a normal pattern of life for the independent system can detect threats without having to pre-identify that threat. For example, the AI models can detect a zero-day virus/zero-day malware etc. which is a previously unknown computer virus or other malware for which specific antivirus software signatures are not yet available. Traditionally, antivirus software relies upon signatures to identify malware/viruses verse deviations from a normal pattern of life.

Note, the lightweight probes cooperating with the AI models detecting abnormal behavior do not need to consume local network TCP/IP traffic, but rather outputs of hardware/sensors in the independent system can be monitored in order to feed the AI models trained to detect unusual behavior.

Figure 3:
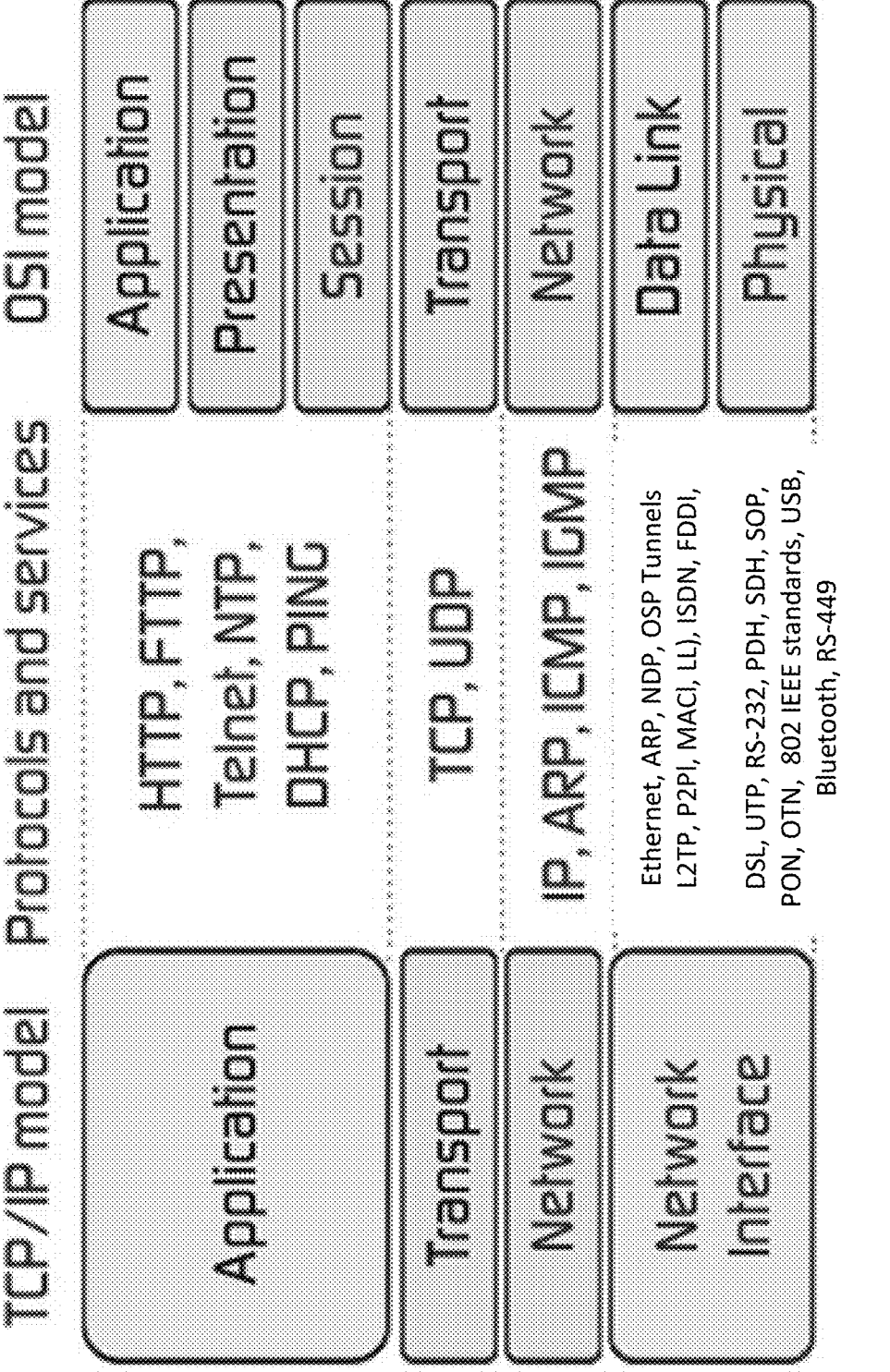
FIG. 3 illustrates an example embodiment of a communication stack of layers with upper and lower layers of structured communication.

FIG. 3 illustrates an example embodiment of a communication stack of layers with upper and lower layers of structured communication. An example communication stack of layers 320 is shown.

The AI models can analyze and model activity in various layers of the communication stack of layers with discrete AI models to pattern their normal pattern of life. The AI model can model, for example, outputs indicative/from of a Physical Layer, outputs indicative/from of a Data Link Layer, outputs indicative/from of a Transport layer, etc. Note, as can be seen readily in the example figure, the same protocols and data types can be found in a Data Link Layer of an OSI model and in a network interface layer of the TCP/IP model. Likewise, the same protocols and data types can be found in a physical layer of an OSI model and in a hardware layer of the TCP/IP model. Thus, the references to a physical layer herein is not restricted to a specific communication model with a stack of layers of communication but rather to a layer of communication that performs these similar functions regardless of the name of that layer in a given communication layer. Likewise, the references to a data link layer herein is not restricted to a specific communication model with a stack of layers of communication but rather to a layer of communication that performs these similar functions regardless of the name of that layer in a given communication layer.

The protocol sources and types of data analyzed in the data link layer and physical layer are all lower in the protocol stack than the Network layer/Internet layer. The analyzer module looks for and analyzes a measure of anomalousness behavior on different input sources (sometimes DNS, etc., rather than packet ingestion and analysis) but using similar components. For example, in the physical layer/hardware layer, the metrics/data from the sensors and/or hardware output can be sent to the lightweight probe and then onto the cyber security appliance 100 to analyze for unusual behavior.

Note, the physical layer can be responsible for the transmission and reception of unstructured raw data between a nodes and components within an independent system. Protocols in the physical layer convert the digital bits into electrical, radio, and/or optical signals. The physical layer can have data types defined with characteristics such as voltage levels, the timing of voltage changes, physical data rates, maximum transmission distances, modulation scheme, channel access method and physical connectors, etc.

The data link layer can transfer data between adjacent network nodes in a wide area network (WAN) or between nodes on the same local area network (LAN) segment. The data link layer can provide the functional and procedural means to transfer data between network entities within an independent system. The data link layer can be concerned with local delivery of frames between nodes on the same level of the network. Protocol communication units generally do not cross the boundaries of a local area network; and thus, these are independent systems. Note, inter-network routing and global addressing are higher-layer functions such as in the application layer, the transport layer, or the network layer, allowing data-link protocols and physical layer protocols to focus on local delivery, addressing, and media arbitration. The data link layer can have data types defined with characteristics such as digital file types such as documents, spreadsheets, images, etc.

Figure 4:
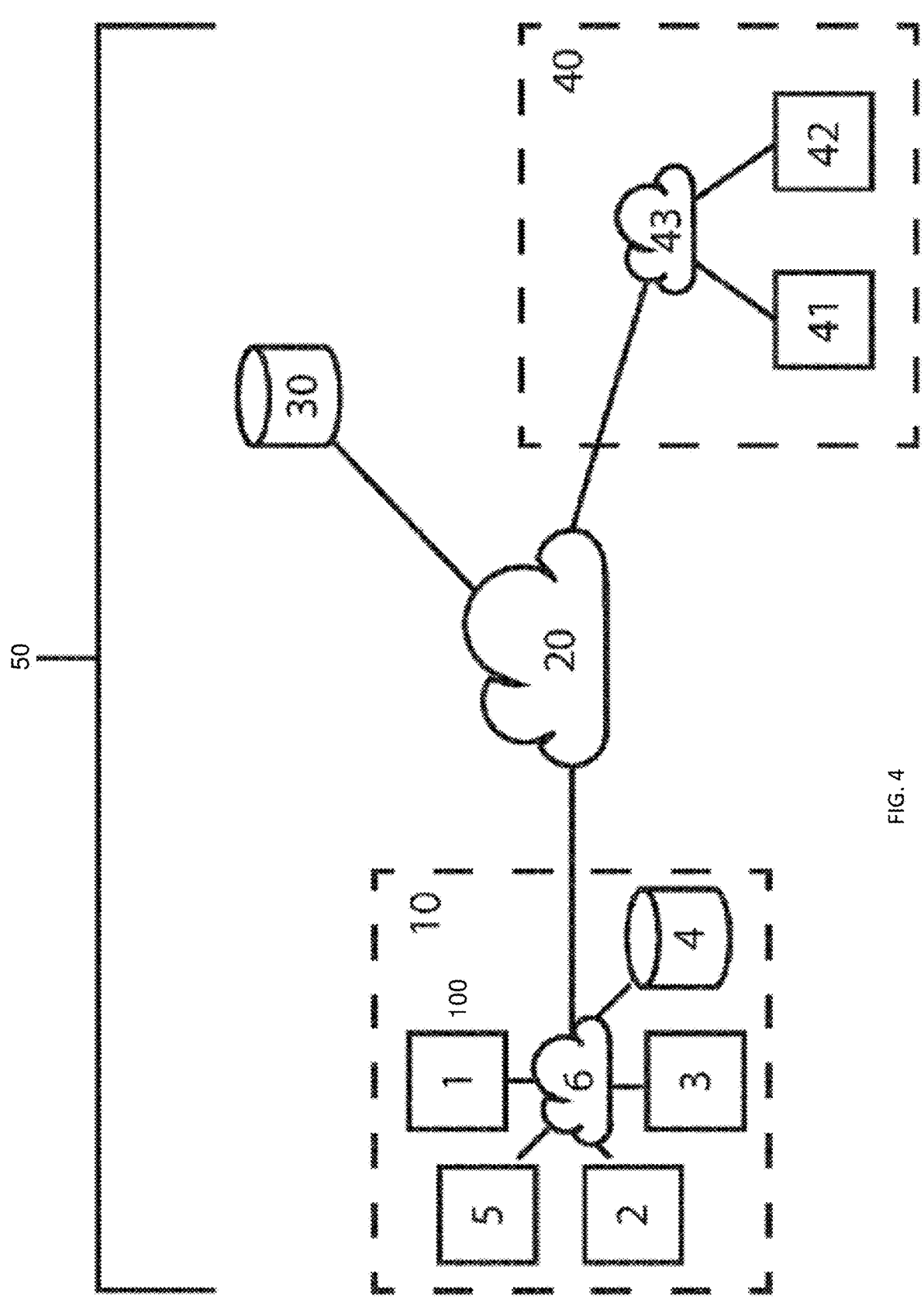
FIG. 4 illustrates an example in the cyber threat defense system to protect an example network.

FIG. 4 illustrates an example cyber threat defense system to protect an example network. The example network of computer systems 50 uses a cyber security appliance 100. The system depicted is a simplified illustration, which is provided for ease of explanation. The system 50 comprises a first computer system 10 within a building, which uses the threat detection system to detect and thereby attempt to prevent threats to computing devices within its bounds.

The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices 18 including server 30 and second computer system 40. The second computer system 40 also includes two computers 41, 42, connected by a second LAN 43.

In this exemplary embodiment of the cyber security appliance 100, computer 1 on the first computer system 10 has the hardware and software of the cyber security appliance 100; and therefore, runs threat detection for detecting threats to the first computer system. As such, the computer system includes one or more processors arranged to run the steps of the process described herein, memory storage components required to store information related to the running of the process, as well as a network interface for collecting the required information from the lightweight probes.

The cyber security appliance 100 in computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 AM and midday, and is active from about 8:30 AM until 6 PM.

The same employee virtually never accesses the employee time sheets, very rarely connects to the company's Atlanta network and has no dealings in South-East Asia. The threat detection system takes all the information that is available relating to this employee and establishes a 'pattern of life' for that person and the devices used by that person in that system, which is dynamically updated as more information is gathered. The 'normal' of the model of the normal pattern of life is used as a moving benchmark, allowing the system to spot behavior on a system that seems to fall outside of this normal pattern of life, and flags this behavior as anomalous, requiring further investigation.

The cyber security appliance 100 is built to deal with the fact that today's attackers are getting stealthier and an attacker/malicious agent may be 'hiding' in a system to ensure that they avoid raising suspicion in an end user, such as by slowing their machine down.

The cyber threat defense system builds a sophisticated 'pattern of life'—that understands what represents normality for every person, device, and network activity in the system being protected by the cyber security appliance 100.

The cyber security appliance 100 can use unsupervised machine learning to works things out without pre-defined labels. In the case of sorting a series of different entities, such as animals, the system analyzes the information and works out the different classes of animals. This allows the system to handle the unexpected and embrace uncertainty when new entities and classes are examined. The system does not always know what it is looking for, but can independently classify data and detect compelling patterns.

The cyber security appliance's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network—even when it does not know what it is looking for.

The cyber security appliance 100 can use a Recursive Bayesian Estimation. To combine these multiple analyses of different measures of network behavior to generate a single overall/comprehensive picture of the state of each device, the cyber security appliance 100 takes advantage of the power of Recursive Bayesian Estimation (RBE) via an implementation of the Bayes filter.

Using RBE, the cyber security appliance's AI models are able to constantly adapt themselves, in a computationally efficient manner, as new information becomes available to the system. The cyber security appliance's AI models continually recalculate threat levels in the light of new evidence, identifying changing attack behaviors where conventional signature based methods fall down.

Training a model can be accomplished by having the model learn good values for all of the weights and the bias for labeled examples created by the system, and in this case; starting with no labels initially. A goal of the training of the model can be to find a set of weights and biases that have low loss, on average, across all examples.

An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

The method, apparatus and system are arranged to be performed by one or more processing components with any portions of software stored in an executable format on a computer readable medium. Thus, any portions of the method, apparatus and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a selfconsistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A cyber threat defense system, comprising:

a central cyber defense appliance configured to protect one or more independent systems from cyber threats by detecting the cyber threats, which is facilitated by one or more extensions of the cyber threat defense system implemented in a form of one or more lightweight probes, where a first lightweight probe is configured to integrate within a first independent system to extend monitoring and gathering of data capability of the central cyber defense appliance, where the first lightweight probe is further configured to establish a secure communication channel with the central cyber defense appliance, and to provide at least remote monitoring and gathering on 1) data, 2) meta data, and 3) a combination of both, from one or more protocols and data types utilized in any of i) a data link layer, ii) a physical layer, or iii) both; and then, one or more of a following layers when that layer is utilized in the first independent system, where the following layers include any of iv) an application layer, v) a transport layer, vi) a network layer, and vii) any combination of these three layers, where the one or more independent systems are selected from a group consisting of i) Internet of Things (IOT) devices, ii) a vehicle's autonomous network, iii) a ship's control network, iv) an airplane's control network, v) any system excluding 1) an email network, 2) an information technology network, 3) a cloud-based platform, or 4) a Software-as-a-Service based environment, and vi) any combination of these, an analyzer module configured to cooperate with one or more Artificial Intelligence (AI) models configured to model a normal pattern of life in each of the independent systems to determine when any of i) an abnormal behavior, ii) a suspicious activity, and iii) any combination of both is detected in that independent system, which uses a protocol in at least one of 1) the data link layer and 2) the physical layer, an autonomous response module configured to generate an autonomous response for the first independent system to take to remediate the detected cyber threat, where the autonomous response module is further configured to send information to take to remediate the detected cyber threat over the secure communication channel to the first lightweight probe, and where any portions of the first lightweight probe implemented in software are configured to be stored in a first non-transitory storage medium in an executable format to be executed by a first set of one or more processors, and where any portions of the central cyber defense appliance implemented in software are configured to be stored in a second set of non-transitory storage mediums in an executable format to be executed by a second set of one or more processors.

2. The cyber threat defense system of claim 1, where the first lightweight probe is part of a suite of two or more different lightweight probes, where the first lightweight probe has a first protocol analyzer for data and/or meta data from a first protocol and data types in the data link layer in the first independent system, where a second lightweight probe has a second protocol analyzer for data and/or meta data from a second protocol and data types in the physical layer in a second independent system, where the first lightweight probe and the second lightweight probe are configured to ingest onboard traffic from any of sensors and other components within their corresponding independent system they integrate within.

3. The cyber threat defense system of claim 1, where the first lightweight probe is configured to ingest onboard traffic from any of a sensor and another component within the first independent system in order to derive the data and/or meta data from the one or more protocols and data types to be sent on to the central cyber defense appliance, where a second lightweight probe is configured to ingest onboard traffic from any of the sensor and the other component within the second independent system in order to derive the data and/or meta data from the one or more protocols and data types to be sent on to the central cyber defense appliance, where the first lightweight probe and the second lightweight probe are both configured to communicate their data and/or meta data over the network to the central cyber defense appliance.

4. The cyber threat defense system of claim 3, where the central cyber defense appliance has a separate AI model for the first independent system and the second independent system in order to detect the cyber threats.

5. The cyber threat defense system of claim 1, where the central cyber defense appliance is configured to unite the data and/or meta data from 1) the one or more independent systems with 2) a different set of data and/or meta data from any of the system including 1) the email network, 2) the information technology network, 3) the cloud-based platform, 4) the Software-as-a-Service based environment, and 5) any combination of these four, connected to a same network, in one environment for analysis of cyber threats in order to detect the cyber threats.

6. The cyber threat defense system of claim 1, where the first lightweight probe is implemented external to the central cyber defense appliance and within the independent system itself to receive system information as metadata from 1) a third-party sensor, 2) a processor in the first independent system, and 3) any combination of both, and then configured to perform one or more of:

i) translation, transformation, or both on ingested system information to an acceptable format for the central cyber defense appliance before transmission over the network to the central cyber defense appliance, ii) perform a limited amount of onboard analysis to filter down an amount of data needing to be transmitted compared to all of the ingested data from the first independent system by the first lightweight probe, and iii) perform protocol parsing to retrieve desired data and/or meta data from the data and/or meta data from any of i) the data link layer, ii) the physical layer, or iii) both; and then, one or more of iv) the application layer, v) the transport layer, vi) the network layer, and vii) any combination of these three layers when that layer is used within the first independent system.

7. The cyber threat defense system of claim 1, where the first lightweight probe is further configured to establish a secure communication mechanism to communicate over the network to with the central cyber defense appliance, where the central cyber defense appliance has the analyzer module configured to analyze i) a current set of data and/or meta data under analysis to ii) the data and/or meta data modeled in the first AI model of the normal pattern of life to detect the cyber threat for the first independent system.

8. The cyber threat defense system of claim 1, where the first AI model of the normal pattern of life of the first independent system and an analyzer module are configured to cooperate with the first lightweight probe to identify time periods associated with the data and meta data from one or more protocols and data types utilized in 1) the data link layer, 2) the physical layer, and 3) any combination of these; as well as, iv) the application layer, v) the transport layer, vi) the network layer, and vii) any combination of these three layers when a protocol is used in that layer in the independent system, which is communicated to the central cyber defense appliance, where the first AI model configured to model the normal pattern of life in the first independent system has one or more machine learning algorithms to guide unsupervised learning on how to deal with missing gaps of data because of i) long periods of non-connectivity to the first independent system, ii) loss of data due to limited storage space for use by the first lightweight probe on the first independent system, and iii) any combination of both.

9. The cyber threat defense system of claim 1, where the one or more Artificial Intelligence (AI) models are trained to model a normal pattern of life for independent systems connecting to the central cyber defense appliance, where a first AI model is configured to model the normal pattern of life for the first independent system from the data and/or the meta data from the protocols and data types in at least any of i) the data link layer and/or ii) physical layer from the first independent system, where the first AI model of the normal pattern of life for the first independent system is configured to use unsupervised machine learning algorithms and feedback on the data and/or the meta data from protocols and data types in, at least, the i) data link layer and/or ii) the physical layer to routinely update the first AI model of the normal pattern of life of the first independent system, during an operation of the first independent system.

10. A method for a cyber threat defense system, comprising:

providing a central cyber defense appliance to protect one or more independent systems from cyber threats by detecting the cyber threats, which is facilitated by one or more extensions of the cyber threat defense system implemented in a form of one or more lightweight probes, where a first lightweight probe is configured to integrate within a first independent system to extend monitoring and gathering of data capability of the central cyber defense appliance, where the first lightweight probe is further configured to establish a secure communication channel with the central cyber defense appliance, and to provide at least remote monitoring and gathering on 1) data, 2) meta data, and 3) a combination of both, from one or more protocols and data types utilized in any of i) a data link layer, ii) a physical layer, or iii) both; and then, one or more of a following layers when that layer is utilized in the first independent system, where the following layers include any of iv) an application layer, v) a transport layer, vi) a network layer, and vii) any combination of these three layers, where the one or more independent systems are selected from a group consisting of i) Internet of Things (IOT) devices, ii) a vehicle's autonomous network, iii) a ship's control network, iv) an airplane's control network, v) any system excluding 1) an email network, 2) an information technology network, 3) a cloud-based platform, or 4) a Software-as-a-Service based environment, and vi) any combination these, providing an analyzer module to cooperate with one or more Artificial Intelligence (AI) models configured to model a normal pattern of life in each of the independent systems to determine when any of i) an abnormal behavior, ii) a suspicious activity, and iii) any combination of both is detected in that independent system, which uses a protocol in at least one of 1) the data link layer and 2) the physical layer and providing an autonomous response module to generate an autonomous response for the first independent system to take to remediate the detected cyber threat, where the autonomous response module is further configured to send information to take to remediate the detected cyber threat over a secure communication channel to the first lightweight probe.

11. The method for the cyber threat defense system of claim 10, where the first lightweight probe is part of a suite of two or more different lightweight probes, where the first lightweight probe has a first protocol analyzer for data and/or meta data from a first protocol and data types in the data link layer in the first independent system, where a second lightweight probe has a second protocol analyzer for data and/or meta data from a second protocol and data types in the physical layer in a second independent system, where the first lightweight probe and the second lightweight probe are configured to ingest onboard traffic from any of sensors and other components within their corresponding independent system they integrate within.

12. The method for the cyber threat defense system of claim 10, comprising:

providing the first lightweight probe to ingest onboard traffic from any of a sensor and another component within the first independent system in order to derive the data and/or meta data from the one or more protocols and data types to be sent on to the central cyber defense appliance, where a second lightweight probe is configured to ingest onboard traffic from any of the sensor and the other component within the second independent system in order to derive the data and/or meta data from the one or more protocols and data types to be sent on to the central cyber defense appliance, where the first lightweight probe and the second lightweight probe are both configured to communicate their data and/or meta data over the network to the central cyber defense appliance.

13. The method for the cyber threat defense system of claim 12, where the central cyber defense appliance has a first AI model for the first independent system and a second AI model for the second independent system in order to detect the cyber threats.

14. The method for the cyber threat defense system of claim 10, comprising:

providing the central cyber defense appliance to unite the data and/or meta data from i) the one or more independent systems with ii) a different set of data and/or meta data from any of the systems including 1) the email network, 2) the information technology network, 3) the cloud-based platform, 4) the Software-as-a-Service based environment, and 5) any combination of these four, connected to a same network, in one environment for analysis of cyber threats in order to detect the cyber threats.

15. The method for the cyber threat defense system of claim 10, comprising:

providing the first lightweight probe to be external to the central cyber defense appliance and become resident within the independent system itself to receive system information as metadata from 1) a third-party sensor, 2) a processor in the first independent system, and 3) any combination of both, and then configured to perform one or more of:

i) translation, transformation, or both on ingested system information to an acceptable format for the central cyber defense appliance before transmission over the network to the central cyber defense appliance, ii) perform a limited amount of onboard analysis to filter down an amount of data needing to be transmitted compared to all of the ingested data from the first independent system by the first lightweight probe, and iii) perform protocol parsing to retrieve desired data and/or meta data from the data and/or meta data from any of i) the data link layer, ii) the physical layer, or iii) both; and then, one or more of iv) the application layer, v) the transport layer, vi) the network layer, and vii) any combination of these three layers when that layer is used within the first independent system.

16. The method for the cyber threat defense system of claim 10, comprising:

providing the first lightweight probe to establish a secure communication mechanism to communicate over the network to with the central cyber defense appliance, where the central cyber defense appliance has the analyzer module configured to analyze i) a current set of data and/or meta data under analysis to ii) the data and/or meta data modeled in the first AI model of the normal pattern of life to detect the cyber threat for the first independent system.

17. The method for the cyber threat defense system of claim 10, comprising:

providing the first AI model of the normal pattern of life of the first independent system and the analyzer module to cooperate with the first lightweight probe to identify time periods associated with the data and meta data from one or more protocols and data types utilized in 1) the data link layer, 2) the physical layer, and 3) any combination of these; as well as, iv) the application layer, v) the transport layer, vi) the network layer, and vii) any combination of these three layers when a protocol is used in that layer in the independent system, which is communicated to the central cyber defense appliance, where the first AI model configured to model the normal pattern of life in the first independent system has one or more machine learning algorithms to guide unsupervised learning on how to deal with missing gaps of data because of i) long periods of non-connectivity to the first independent system, ii) loss of data due to limited storage space for use by the first lightweight probe on the first independent system, and iii) any combination of both.

18. The method for the cyber threat defense system of claim 10, where the one or more Artificial Intelligence (AI) models are trained to model a normal pattern of life for independent systems connecting to the central cyber defense appliance, where a first AI model is configured to model the normal pattern of life for the first independent system from the data and/or the meta data from the protocols and data types in at least any of i) the data link layer and/or ii) physical layer from the first independent system, where the first AI model of the normal pattern of life for the first independent system is configured to use unsupervised machine learning algorithms and feedback on the data and/or the meta data from protocols and data types in, at least, the i) data link layer and/or ii) the physical layer to routinely update the first AI model of the normal pattern of life of the first independent system, during an operation of the first independent system.

* * * * *